United States Patent
Choi

[19]

[11] Patent Number: 5,907,458
[45] Date of Patent: May 25, 1999

[54] HEAD DRUM HAVING WEIGHT BALANCING PLATE WITH REMOVABLE PORTIONS

[75] Inventor: Jin-Seung Choi, Seoul, Rep. of Korea

[73] Assignee: Samsung Electronics Co., Ltd., Kyungki-do, Rep. of Korea

[21] Appl. No.: 08/889,584

[22] Filed: Jul. 8, 1997

[30] Foreign Application Priority Data

Jul. 10, 1996 [KR] Rep. of Korea ...................... 96-27833

[51] Int. Cl.⁶ ....................................................... G11B 5/52
[52] U.S. Cl. ............................................................ 360/107
[58] Field of Search ............................... 360/107, 84–85, 360/95, 130.22–130.24, 128–129

[56] References Cited

U.S. PATENT DOCUMENTS

| | | | |
|---|---|---|---|
| 4,630,156 | 12/1986 | Saito | 360/99.05 |
| 4,823,218 | 4/1989 | Ibe et al. | 360/104 |
| 4,849,839 | 7/1989 | Tsubota et al. | 360/84 |
| 5,159,505 | 10/1992 | Horiuchi et al. | 360/84 |
| 5,763,967 | 6/1998 | Kurosawa et al. | 360/98.07 |

FOREIGN PATENT DOCUMENTS 6-84152  3/1994  Japan .

*Primary Examiner*—Brian E. Miller
*Attorney, Agent, or Firm*—Sughrue, Mion, Zinn, Macpeak & Seas, PLLC

[57] ABSTRACT

A head drum of a tape recorder has a weight balancing device for preventing vibrations occurring during the revolution of the head drum. In particular, the head drum includes a stationary drum fixed to a deck, a rotary drum rotatably installed above the stationary drum, and a circular weight balancing plate installed coaxially with the rotary drum and having a plurality of removable portions formed therein which can be removed by an external force.

4 Claims, 3 Drawing Sheets

HEAD DRUM HAVING WEIGHT BALANCING PLATE WITH REMOVABLE PORTIONS

BACKGROUND OF THE INVENTION

The present invention relates to a head drum of a tape recorder and, more particularly, to a head drum having a weight balancing plate.

In a typical tape recorder such as a VCR or a camcorder, a head drum for scanning a magnetic tape while revolving at high speed is installed angled with respect to a tape running direction in order to record/reproduce information on/from the running magnetic tape.

Referring to FIG. 1, a conventional head drum 1 includes a stationary drum 2 fixed to a deck (not shown) and a rotary drum 3 rotatably installed above the stationary drum 2.

A magnetic head 4 is installed in the rotary drum 3. A portion of the magnetic head 4 protrudes through an opening window 3a of the rotary drum 3, and contacts the outer circumferential surface of the rotary drum 3 so as to record information on a magnetic tape 5 or read recorded information therefrom. The rotary drum 3 revolves at high speed. In general, a rotary drum of a VHS-type tape recorder revolves at a speed of about 1800 r.p.m. (revolutions per minute), and that of a DVC-type tape recorder at a speed of about 9000 r.p.m. In this case, when the weight of the rotary drum 3 is unbalanced, vibrations occur which exert a bad influence on the recording and reproduction of information on/from the magnetic tape 5 by the magnetic head 4.

According to the conventional technology, a balancing weight 6 having a predetermined weight is attached to the rotary drum 3 to balance the weight of the rotary drum 3. However, it is not only difficult to set the exact position and weight of the balancing weight 6, but it is also difficult to attach the balancing weight 6 to the rotary drum 3.

Another method for balancing the weight of the rotary drum is to cut away a portion of the rotary drum itself. However, it is difficult to control the position and amount of the cutting and also it takes quite a long time to perform this method. Furthermore, the cutting method may exert a bad influence on other components.

SUMMARY OF THE INVENTION

To overcome the above problems, it is an object of the present invention to provide a head drum having a weight balancing device by which the weight of a rotary drum can be easily and rapidly balanced.

Accordingly, to achieve the above object, there is provided a head drum of a tape recorder which includes a deck, the head drum including a stationary drum fixed to the deck, a rotary drum rotatably mounted with respect to the stationary drum, and a circular weight balancing plate installed coaxially with the rotary drum and having a plurality of removable portions formed therein which are operative to be removed by an external force.

It is preferred in the present invention that each of the removable portions is separated from the weight balancing plate by two corresponding half-circular openings and supported by two connecting portions which connect the corresponding removable portion to the weight balancing plate.

BRIEF DESCRIPTION OF THE DRAWINGS

The above object and advantages of the present invention will become more apparent by describing in detail a preferred embodiment thereof with reference to the accompanying drawings, in which.

DETAILED DESCRIPTION OF THE INVENTION

Figure 1:
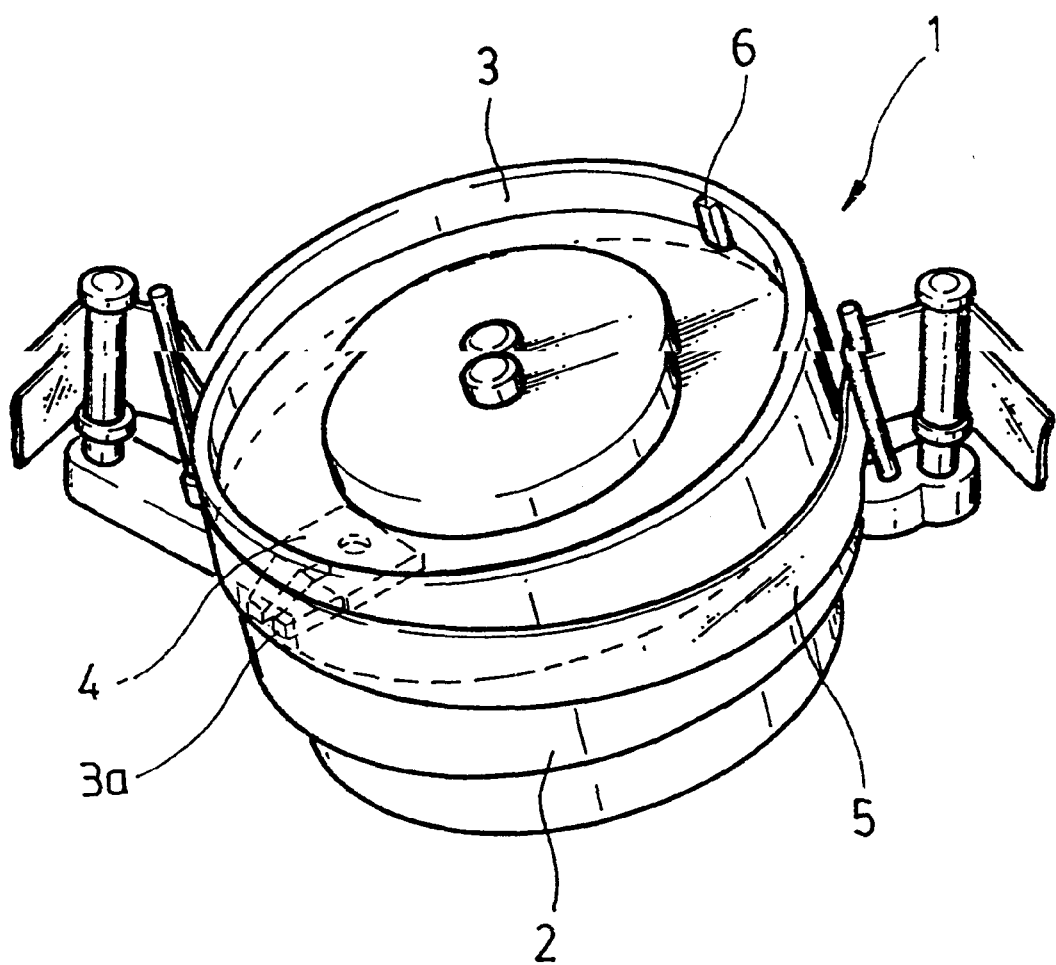
FIG. 1 is a perspective view illustrating a conventional head drum.
Figure 2:
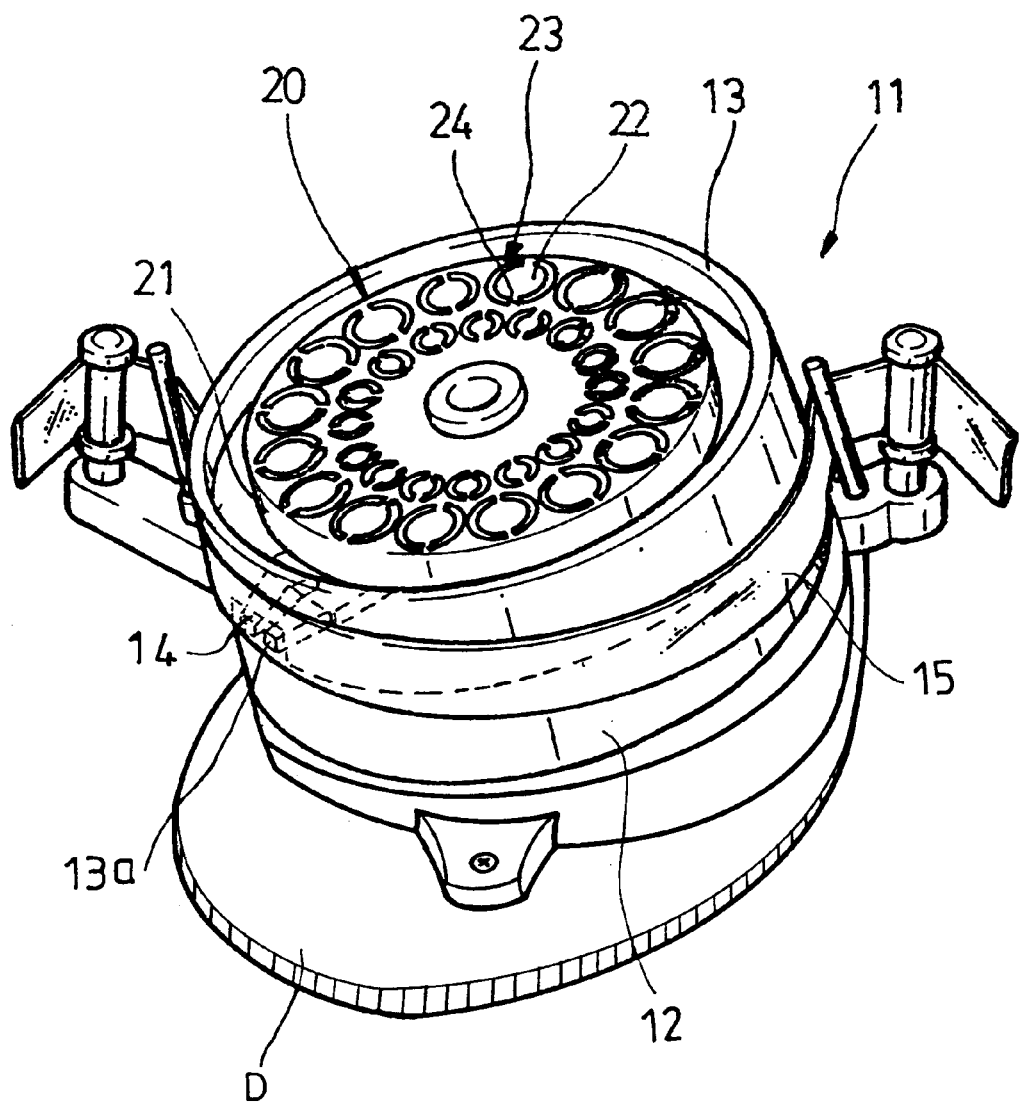
FIG. 2 is a perspective view illustrating a head drum having a weight balancing plate according to the present invention.

Referring to FIG. 2, a head drum 11 of a tape recorder according to the present invention has a stationary drum 12 fixed to a deck "D", a rotary drum 13 rotatably installed above the stationary drum 12, and a weight balancing device 20 for balancing the weight of the rotary drum 13.

A magnetic head 14 is installed in the rotary drum 13. A portion of the magnetic head 14 protruding through an opening window 13a of the rotary drum 13 records or reads information on/from a magnetic tape 15 running while contacting the outer circumferential surface of the rotary drum 13.

In, the present invention, the weight of the rotary drum 13 revolving at high speed can be balanced by means of the weight balancing device 20. The weight balancing device 20 is installed coaxially with the rotary drum 13 and includes a circular weight balancing plate 21 having a plurality of removable portions 22.

Figure 3:
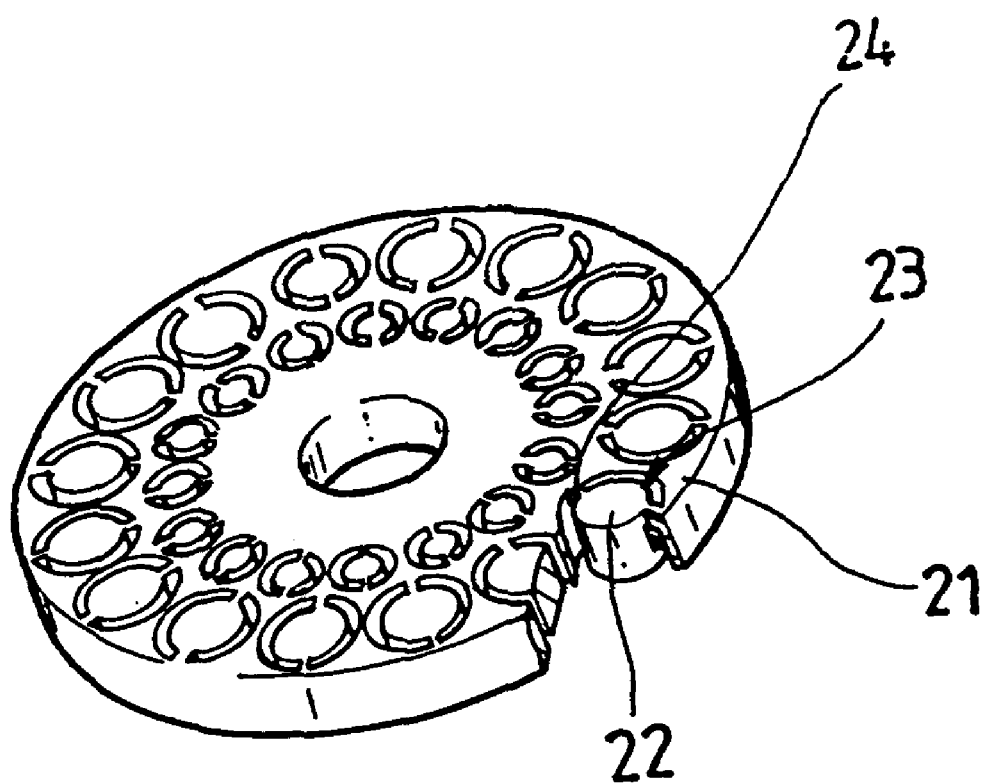
FIG. 3 is a partially cutaway perspective view illustrating the weight balancing plate shown in FIG. 2.

Referring to FIG. 3, each removable portion 22 is formed by forming corresponding half-circular openings in the weight balancing plate 21. That is, each removable portion 22 separated from the weight balancing plate 21 by the two corresponding half-circular openings 23 is supported by two connecting portions 24 which are connected to the weight balancing plate 21. Thus, a selected removable portion(s) 22 can be easily removed as needed by breaking the frangible connecting portions 24 using a suitable tool such as a screwdriver.

The weight balancing of the head drum according to the present invention having the above structure is achieved as follows.

Referring to FIGS. 2 and 3, information on weight correction is obtained using a weight balance tester (not shown) while the rotary drum 13 revolves. Next, the rotary drum 13 is stopped and the appropriate number of the removable portions 22 at the appropriate position(s) according to the weight correction information is(are) removed by an external force. Thus, the weight of the rotary drum 13 is balanced so that it can revolve at high speed without vibrations.

As described above, in the head drum according to the present invention, the weight of the rotary drum can be easily and rapidly balanced by removing a portion of the weight balancing plate installed on the rotary drum.

It is noted that the present invention is not limited to the preferred embodiment described above, and it is apparent that variations and modifications by one skilled in the art can be effected within the spirit and scope of the present invention defined in the appended claims.

What is claimed is:

1. A head drum of a tape recorder which includes a deck, said head drum comprising:

a stationary drum fixed to the deck;

a rotary drum rotatably mounted with respect to said stationary drum; and a circular weight balancing plate installed coaxially with said rotary drum, said circular weight balancing plate having a plurality of removable portions formed therein and frangibly connected thereto and which are operative to be removed by an external force.

2. The head drum as claimed in claim 1, wherein each of said removable portions is separated from said weight balancing plate by two corresponding half-circular openings and supported by two connecting portions which connect a corresponding said removable portion to said weight balancing plate.

3. The head drum as claimed in claim 2, wherein said two connecting portions are frangible when the external force is applied to remove the corresponding said removable portion.

4. A head drum of a tape recorder which includes a deck, said head drum comprising:

a stationary drum fixed to the deck;

a rotary drum rotatably mounted with respect to said stationary drum; and a circular weight balancing plate installed coaxially with said rotary drum and having a plurality of removable portions formed therein which are operative to be removed by an external force, wherein each of said removable portions is separated from said weight balancing plate by two corresponding half-circular openings and supported by two connecting portions which connect a corresponding said removable portion to said weight balancing plate.

* * * * *